United States Patent
Liardet et al.

(10) Patent No.: US 7,747,665 B2
(45) Date of Patent: *Jun. 29, 2010

(54) STANDARDIZATION OF A NOISE SOURCE FOR RANDOM NUMBER GENERATION

(75) Inventors: Pierre-Yvan Liardet, Peynier (FR); Yannick Teglia, Marseilles (FR); Ambroise Tomei, Aix en Provence (FR)

(73) Assignee: STMicroelectronics S.A., Montrouge (FR)

( * ) Notice: Subject to any disclaimer, the term of this patent is extended or adjusted under 35 U.S.C. 154(b) by 910 days.

This patent is subject to a terminal disclaimer.

(21) Appl. No.: 10/927,697

(22) Filed: Aug. 27, 2004

(65) Prior Publication Data

US 2005/0050123 A1 Mar. 3, 2005

(30) Foreign Application Priority Data

Aug. 28, 2003 (FR) .................................... 03 50466

(51) Int. Cl.
*G06F 7/58* (2006.01)

(52) U.S. Cl. ........................................................ 708/250
(58) Field of Classification Search .......... 708/250–256
See application file for complete search history.

(56) References Cited

U.S. PATENT DOCUMENTS

| | | | |
|---|---|---|---|
| 5,692,102 A | 11/1997 | Pan | |
| 6,477,481 B1 * | 11/2002 | Umeno | 702/179 |
| 6,862,605 B2 * | 3/2005 | Wilber | 708/255 |
| 7,007,051 B2 * | 2/2006 | Hourdequin et al. | 708/250 |
| 7,266,575 B2 * | 9/2007 | Ikeda | 708/250 |
| 2005/0249273 A1 * | 11/2005 | Ashley et al. | 375/232 |

* cited by examiner

*Primary Examiner*—Chat C Do
(74) *Attorney, Agent, or Firm*—Lisa K. Jorgenson; James H. Morris; Wolf, Greenfield & Sacks, P.C.

(57) ABSTRACT

A method and a circuit for standardizing a noise source providing an initial bit flow, including dividing the initial bit flow into bit words of identical lengths, and assigning an output state according to the states of the bits of the current word and to a pre-established assignment rule, the assignment rule being inverted according to the occurrence, in the initial bit flow, of words, all the bits of which have identical states.

11 Claims, 1 Drawing Sheet

STANDARDIZATION OF A NOISE SOURCE FOR RANDOM NUMBER GENERATION

BACKGROUND OF THE INVENTION

1. Field of the Invention

The present invention relates to the field of random number generators, and more specifically to random number generators in the form of bit flows originating from one or several noise sources, digital or digitized.

2. Discussion of the Related Art

FIG. 1 very schematically shows in the form of blocks an example of a bit flow generator of the type to which the present invention can apply.

Such a generator is based on the use of a noise source 1 (NS) providing analog noise to analog-to-digital conversion elements 2 (CAD) clocked by a clock CLK and providing a bit flow BS. Source 1 is, for example, formed of one or several oscillators having their outputs added up to provide an analog noise at the input of converter 2. Converter 2 may, in simplified fashion, be a comparator associated with a flip-flop.

The quality of a random generator or more generally of a noise source is measured by the quality of its random character, that is, the equiprobability for flow BS to provide any number and, in particular, the equiprobability of finding 0s and 1s in the flow.

In practice, there are risks for flow BS provided by converter 2 not to have an equiprobable distribution of its elements (bits or bit words). In particular, noise source 1 generally uses oscillators for which there is a risk of synchronization together or with clock CLK. In case of a synchronization, the output state (flow BS) remains constant.

To improve the equiprobability of a bit flow meant to be random, flow BS crosses a standardization circuit 3 (NORM) providing a modified bit train NBS and in which the equiprobable character of the zeros and ones in the flow is improved.

FIG. 2 shows a conventional example of a circuit 3 for standardizing a bit flow BS applying a so-called Von Neumann method. Such a circuit 3 is based on an analysis of incoming bit flow BS, by bit pairs. A storage element 4 (BUFF) enabling processing of the bits, by pairs, in a state determination circuit 5 which provides standardized bit flow NBS, is then used. According to the Von Neumann method, if the bit pair is 10, a state 1 is generated. If the bit pair is 01, a state 0 is generated. If the bit pair is 00 or 11, it is ignored, that is, no state is output.

A disadvantage of the Von Neumann method is that the rate of standardized bit flow NBS is not constant, that is, the period with which the bits are provided is not regular. In a simple Von Neumann circuit such as described hereabove, the bit rate of flow NBS varies between twice and four times less than the rate of input flow BS.

SUMMARY OF THE INVENTION

The present invention aims at providing a standardization of a noise source providing a digital bit flow which improves known Von Neumann solutions.

The present invention more specifically aims at making the output rate of the standardization element constant.

The present invention also aims at increasing the flow rate with respect to a standardization of Von Neumann type.

To achieve these and other objects, the present invention provides a method for standardizing a noise source providing an initial bit flow, comprising:

dividing the initial bit flow into bit words of identical lengths; and assigning an output state according to the states of the bits of the current word and to a pre-established assignment rule, the assignment rule being inverted according to the occurrence, in the initial bit flow, of words, all the bits of which have identical states.

According to an embodiment of the present invention, the output bit assignment rule is inverted upon each occurrence of a word of bits of identical states in the initial flow.

According to an embodiment of the present invention, the inversion of the output states is conditioned by a combination of bits detecting the occurrence of words of bits of identical states of each type, respectively.

According to an embodiment of the present invention, the bit assigned to a word of bits of identical states in the initial flow depends on the output state provided for at least one preceding bit word.

The present invention also provides a circuit for standardizing a bit flow provided by a noise source, comprising:

an element for assigning a state 0 or 1 according to the respective states of each word of identical length of bits of an initial flow; and an element for detecting words, all the bits of which have identical states conditioning an inversion of the states output by the assignment element.

The foregoing objects, features, and advantages of the present invention will be discussed in detail in the following non-limiting description of specific embodiments in connection with the accompanying drawings.

DETAILED DESCRIPTION

Figure 1:
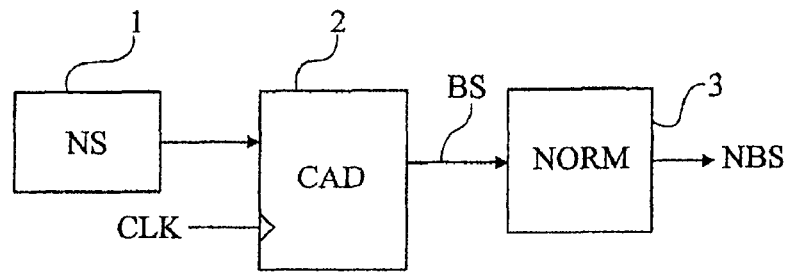
FIGS. 1 and 2, previously discussed, are intended to show the state of the art and the problem to solve.

The same elements have been designated with the same references in the different drawings. For clarity, only those elements which are necessary to the understanding of the present invention have been shown in the drawings and will be described hereafter. In particular, the obtaining of the bit flow to be standardized has not been described in detail, the present invention being implementable whatever this flow and especially whether it has or not been submitted to other standardization processings. Similarly, the destination of the standardized bit flow obtained by the present invention is compatible with all conventional uses of bit flows for random generators and especially for a combination, for example, by association in parallel of several bit flows, to obtain random words. For simplification, the present invention will be described in relation with an incoming flow processed by words of two consecutive bits. It, however, applies to words of greater length.

A feature of the present invention is, in a standardization method of Von Neumann type, to conditionally invert the states of the output flow. According to the present invention, such an inversion of these states is caused by the occurrence of certain states of bits of the original flow.

Figure 3:
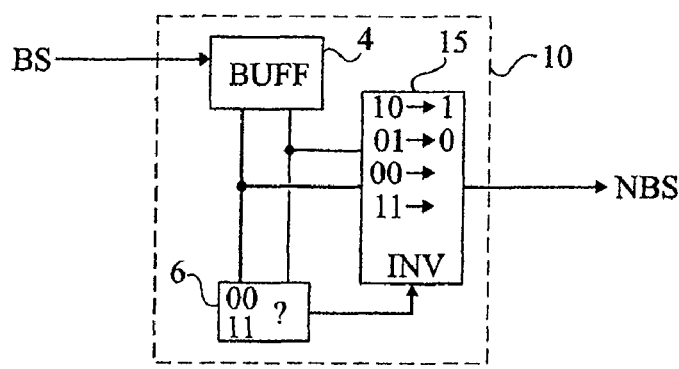
FIG. 3 very schematically shows in the form of blocks an embodiment of a standardization circuit according to the present invention.

FIG. 3 very schematically shows in the form of blocks an embodiment of a standardization circuit according to the present invention.

Figure 2:
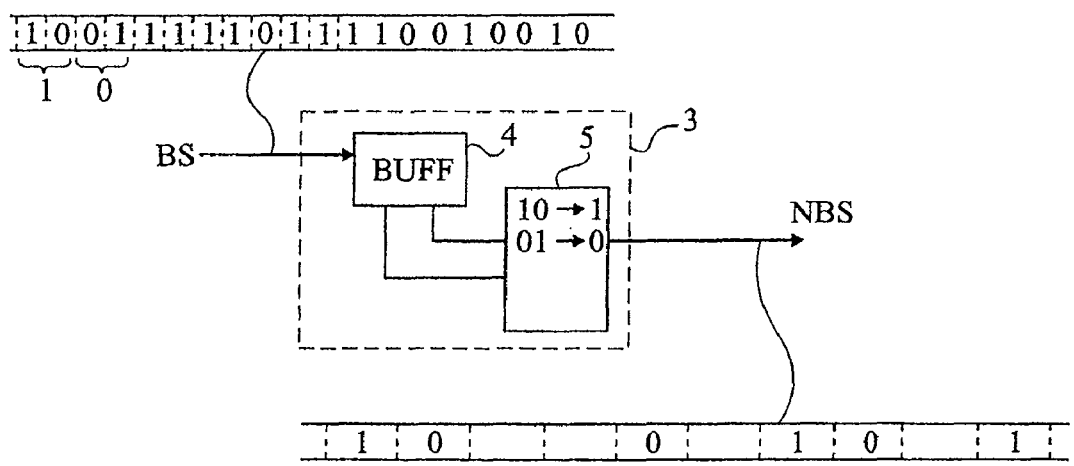

As in the conventional case of FIG. 2, at least one bit of incoming flow BS is stored (block 4, BUFF) to enable processing of the flow bits by pairs. According to the way in which the bit pairs are processed in practice, two successive bits of flow BS, or even more, may have to be stored.

According to the present invention, a state determination element 15 provides a standardized output bit flow NBS according to the respective states of the current bit pair. Element 15 receives an inversion configuration signal (INV) from a block 6 of detection of doublets in bit flow BS. According to the chosen embodiment, and as will be seen hereafter, several configurations may condition the inversion. By arbitrary convention, a state 1 is considered as being active, and a state 0 is considered as being inactive.

Another feature of the present invention is to assign an output state upon occurrence of a doublet in incoming flow BS.

Conversely to what used to be believed, it is possible to assign an output state to the identical bit pairs while keeping an equiprobable flow, due to the above-mentioned inversion, which avoids always assigning the same output state upon occurrence of a doublet of a given type (00 or 11).

According to a first implementation mode, the state of bit INV is inverted each time a pair 00 or 11 appears, and determination element 15 is provided to provide the following states:

for an incoming pair 01: 0 if bit INV is inactive, 1 in the opposite case;
for a pair 10: 1 if bit INV is inactive, 0 in the opposite case;
for a pair 00: 1 if bit INV is active, 0 in the opposite case; and
for a pair 11: 0 if bit INV is active, 1 in the opposite case.

With such an embodiment and assuming, for example, that bit INV is initially in the inactive state, an incoming bit flow BS 01100001101110 translates as a standardized output flow NBS 0101001.

For simplification, it has been considered that the decision as to the state of the output, upon occurrence of a doublet, is taken before the possible change of the state of bit INV. The contrary is however possible.

According to a second embodiment of the present invention, two bits INV0 and INV1 are used within circuit 6. These bits are respectively assigned to the occurrence of pairs 00 and pairs 11, and their respective states invert upon each occurrence of the corresponding pair. The obtaining of bit INV then corresponds to a combination of two bits INV0 and INV1. For example, bit INV is placed in an active state if bits INV0 and INV1 are in opposite states and in an active state if these two bits are in the same state. The decision diagram of element 15 is, in this example, not modified.

According to this example of embodiment and assuming initially inactive bits INV0, INV1, and INV (state 0) and a decision about the doublets before a possible change of the state of bit INV, a bit flow BS 011000011011101111 translates as a standardized bit flow NBS 010100110.

As an alternative, bit INV conditions the state of the output bits for pairs 01 and 10, and bits INV0 and INV1 condition the states of the output bits for pairs 00 and 11. Element 15 then receives bits INV0 and INV1 provided by element 6.

According to a third embodiment of the present invention, the criteria of decision element 5 are the same as in the previous embodiments for pairs 01 and 10. However, upon occurrence of a pair 00 and 11, the state of the output bit corresponds to the state of the preceding output bit or to its inverse, according to whether inversion bit INV is or not active.

According to this third embodiment and assuming an element 6 according to the first embodiment, a sequence BS 011000011011101100 becomes a sequence NBS 010100100.

According to a fourth embodiment of the present invention, the second and third preceding embodiments are combined to assign inversion bits INV0 and INV1 dedicated to each type of identical pairs, and account is taken of the state of the preceding output bit to assign an output bit to a pairs of identical states.

Other combinations of the above-descried embodiments are of course possible.

An advantage of the present invention is that the rate of the standardized bit flow thus obtained is only divided by two with respect to the original flow.

Another advantage is that this flow is constant.

Of course, the present invention is likely to have various alterations, modifications, and improvements which will readily occur to those skilled in the art. In particular, the practical implementation of a standardization circuit according to the present invention, be it in hardware or software form, is within the abilities of those skilled in the art based on the functional indications given hereabove by using conventional tools.

Further, although the present invention has been described in relation with the exploitation of bit pairs, it more generally applies whatever the length (even or odd) of considered words or sections of the incoming flow. For example, the incoming bits may be processed four by four where the conventional Von Neumann method does not consider words with four bits of identical states (0000 and 1111). Adapting the described embodiments to words of more than two bits is within the abilities of those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for standardizing an initial bit flow, which is provided by a first noise source, in an apparatus having a buffer resulting in a standardized bit flow output, the method comprising:
   dividing the initial bit flow provided by the first noise source into a plurality of bit words of identical lengths and storing at least one bit word in a buffer;
   generating an output bit stream based at least in part on the input bit flow provided by the first noise source, each bit of the output bit stream corresponding to one bit word of the plurality of bit words;
   assigning an output state for at least some bits of the output bit stream based on bit states of corresponding bit words stored in the buffer; and
   inverting the output state according to the occurrence, in the initial bit flow, of at least one bit word having identical bit states so that the output bit stream provides a standardized bit flow.

2. The method of claim 1, wherein inverting the output state comprises inverting the output state upon each occurrence of a bit word having identical bit states.

3. The method of claim 1, in which the inversion of the output state is conditioned by a combination of bits detecting the occurrence of bit words having identical states of each type, respectively.

4. The method of claim 1, in which the bit assigned to a bit word having identical states in the initial bit flow depends on the output state provided for at least one preceding bit word.

5. An apparatus for standardizing a bit flow provided by a first noise source, the apparatus comprising:

a first circuit for assigning a state 0 or 1 according to the respective states of each bit word of identical length of an initial bit flow; and a second circuit for detecting bit words, all the bits of which have identical states, the second circuit outputting an inversion bit to the first circuit to invert the state assigned by the first circuit, wherein in response to the inversion bit, the first circuit provides a standardized bit flow as an output.

6. An apparatus for receiving an input bit flow and providing a standardized bit flow as an output, comprising:

a storage circuit for processing input bits of an input bit flow, each of the input bits having a state value, the input bit flow being divided into a plurality of bit words having identical lengths;

a detection circuit for determining if the input bits of each bit word have identical state values, the detection circuit having at least one output; and a third circuit, connected to the storage circuit and the detection circuit, for assigning the bit word a final output value based at least on the at least one output and the state values of the input bits, wherein, to provide the final output value, the at least one output inverts the state values of the input bits according to the occurrence, in the input bit flow, of at least one bit word having identical state values of the input bits so that the third circuit provides a standardized bit flow as an output.

7. The apparatus of claim 6, wherein the input bit flow is supplied by an analog-to-digital converter.

8. The apparatus of claim 6, wherein the final output value is based partly on the state values of previous input bits.

9. The apparatus of claim 6, wherein the third circuit assigns the final output value of 1 or 0.

10. The apparatus of claim 6, wherein a noise source supplies the input bit flow.

11. The apparatus of claim 10, wherein the noise source is an oscillator.

\* \* \* \* \*